United States Patent [19]

Kobayashi et al.

[11] Patent Number: 5,688,344

[45] Date of Patent: Nov. 18, 1997

[54] HEAVY DUTY RADIAL TIRE WITH AT LEAST FOUR STEEL CORD LAYERS

[75] Inventors: Yasuhiko Kobayashi; Kazuhito Numata, both of Kodaira, Japan

[73] Assignee: Bridgestone Corporation, Tokyo, Japan

[21] Appl. No.: 344,676

[22] Filed: Nov. 21, 1994

[51] Int. Cl.$^6$ .................... B60C 9/18; B60C 9/20
[52] U.S. Cl. .................... 152/527; 152/526; 152/534; 152/535
[58] Field of Search .................... 152/526–527, 152/534, 535, 531

[56] References Cited

U.S. PATENT DOCUMENTS

| | | | |
|---|---|---|---|
| 4,742,858 | 5/1988 | Takahira | 152/526 X |
| 5,024,261 | 6/1991 | Igarashi et al. | 152/527 |
| 5,027,877 | 7/1991 | Tamura et al. | 152/527 |
| 5,054,532 | 10/1991 | Kohno et al. | 152/527 |
| 5,261,475 | 11/1993 | Yoshino et al. | 152/526 X |
| 5,327,954 | 7/1994 | Nakamura | 152/526 X |
| 5,383,507 | 1/1995 | Sato et al. | 152/527 |

FOREIGN PATENT DOCUMENTS

A-4-11503  1/1992  Japan.

*Primary Examiner*—Adrienne C. Johnstone
*Attorney, Agent, or Firm*—Oliff & Berridge

[57] ABSTRACT

A heavy duty radial tire having a belt layer assembly formed of at least four layers formed from steel cords. The belt layers may be divided into two groups: a group of outer layers which are disposed at an outer side in a radial direction of the tire, and a group of inner layers which are disposed at an inner side in the radial direction of the tire. Cross-sectional areas of the steel cords of at least one layer of the group of outer layers are greater than the cross sectional areas of the steel cords of the group of inner layers. The steel cords of at least one layer of the group of outer layers and the group of inner layers are provided such that ratios I/A of cross sectional secondary moments I and cross sectional areas A of the steel cords are greater than or equal to $4.5 \times 10^{-3}$ mm$^2$. Accordingly, a superior effect can be achieved in that cut resistance can be improved without deterioration in other properties of the tire.

16 Claims, 2 Drawing Sheets

HEAVY DUTY RADIAL TIRE WITH AT LEAST FOUR STEEL CORD LAYERS

BACKGROUND OF THE INVENTION

1. Field of the Invention

The present invention relates to a heavy duty radial tire, and more particularly, to a heavy duty radial tire which is suitable for large ORR (a radial tire for a construction vehicle) and in which the resistance of the tread to cut damage is improved.

2. Description of the Related Art

Cut damage, such as penetration of the belts of the tire tread while the vehicle is traveling, is problematic for the durability of the tire. As a result, conventionally, various measures have been taken in order to improve the cut resistance of the belts, such as increasing the number of layered belts, mitigating the input of force from the tread to the belt layer by appropriately modifying the belt angles, and the like.

However, none of these techniques has resulted in a great improvement in cut resistance. Increasing the number of belt layers leads to an increase in cost as well as deterioration in the properties of the tire due to generation of heat resulting from the increase in gauge at the tread portion. Increasing the number of embedded steel cords results in the narrowing of the spaces between the cords, and consequently in the deterioration of the belt end separation performance. Further, if, in order to mitigate the input of force from the tread to the belt layer, the angles at which the belt cords cross the equatorial plane are increased so as to reduce the flexural rigidity of the belts, the tensile rigidity decreases. This leads to a deterioration in friction resistance which accompanies the increase in growth of the diameter when the tire is inflated.

Cut damage which occurs during traveling can be divided into the following two types of damage: defects in which the cords are cut successively from the radial direction outer side belt, resulting in total breakage (hereinafter referred to as A defects), and defects in which the cords break due to tension which is generated when the tire travels over a relatively dull, large protrusion and the entire belt curves greatly, resulting in total breakage (hereinafter referred to as B defects).

In A defects, the cut begins from the radial direction outer side belt layer. In order to prevent such a defect, Japanese Patent Application Laid-Open No. 4-11503 proposes increasing the strength of the radial direction outer side belt layers, without increasing the number of embedded cords, by disposing cords having large cross sectional areas in the belt layers at the outer side.

The cross sectional area of the cord can be increased by increasing the number of filaments or by increasing the filament diameter. Usually, decreasing the flexural rigidity of the cords improves the enveloping property for cut input, and consequently is good for cut resistance. Accordingly, a method is used in which the filament diameter is made smaller and the number of filaments is increased.

However, because merely increasing the cross sectional area of the cord makes it easier for separation to occur, it is necessary to decrease the number of embedded cords. It is difficult to increase the cross sectional area of the cord without sacrificing other properties. Accordingly, satisfactory effects have not yet been obtained with respect to cut resistance.

In the case of B defects, tension is generated by the bending of the belt layers. This tension becomes as large as the tension of the belt layers at the outer side of the bending deformation, i.e., the belt layers at the inner side in the radial direction of the tire. The belt layers at the inner side in the radial direction of the tire break first. Namely, the breakability of the belt layers at the inner side governs the cut resistance against B defects. The tension at the time when the belt layers at the inner side are subject to bending deformation becomes larger as the belt layer thickness becomes greater. Therefore, increasing the diameter of the belt layer as a measure to improve cut resistance against A defects leads to an increase in weight and in gauge and a deterioration in performance with respect to B defect cuts.

SUMMARY OF THE INVENTION

In view of the aforementioned, an object of the present invention is to provide a heavy duty radial tire in which cut resistance of the tire can be improved without deterioration in the other properties of the tire.

As the result of various experimental studies, the inventors of the present invention found that when a tire travels on a sharp protrusion, the steel cords of the belt layers at the radial direction outer side of the tire bend locally, and that A defects are caused by the tensile breakage of the outer side filaments of the locally bent steel cords.

Further, the inventors found that the maximum stress generated at the filaments at the outer side of the bending during this local bending corresponds to the flexural rigidity of the steel cord, i.e., to the cross sectional secondary moment I of the steel cord (the cross sectional secondary moment I of the steel cord is the total sum of the cross sectional secondary moments of the respective entwined filaments $(\pi/64)d^4$, wherein d is the filament diameter). Here, in order to increase the flexural rigidity of the steel cord, it is necessary to increase the cross sectional area of the steel cord. However, as the result of various studies, the inventors discovered that even if the cross sectional area of the steel cord is increased without increasing the filament diameter, cut resistance improves only slightly. By increasing the filament diameters and increasing the cross sectional secondary moments, cut resistance can be greatly improved.

Further, by setting the ratios I/A of the cross sectional secondary moments I and the cross sectional areas A of the steel cords at the radial direction outer side of the belt to greater than or equal to $4.5 \times 10^{-3}$ mm$^2$, cut resistance can be most effectively exhibited. (The cross sectional area A of a steel cord is the total sum of the cross sectional areas $\pi (d/2)^2$ of the respective entwined filaments, wherein d is the filament diameter).

A first aspect of the present invention is a heavy duty radial tire comprising: a belt layer assembly which is provided at a crown portion of a carcass extending in a toroidal shape, said belt layer assembly being formed of at least four layers which are formed from steel cords. Wherein the layers of said belt layer assembly are divided into two groups which a group of outer layers positioned at an outer side in a radial direction of said radial tire and a group of inner layers positioned at an inner side in the radial direction of said radial tire, the cross sectional areas of the steel cords of at least one layer of the group of outer layers are greater than the cross sectional areas of the steel cords of the group of inner layers, wherein ratios I/A of cross sectional secondary moments I and cross sectional areas A of the steel cords of at least one layer of the group of outer layers and the group of inner layers are greater than or equal to $4.5 \times 10^{-3}$ mm$^2$, wherein, when the filament diameter of a steel cord is d, I = Σ $((\pi/64)d^4)$ and A = πΣ $(d/2)^2$.

In a second aspect of the present invention, in the heavy duty radial tire of the first aspect, ratios I/A of cross sectional secondary moments I and cross sectional areas A of the steel cords of the at least one layer of the group of outer layers are greater than or equal to $4.5 \times 10^{-3}$ mm$^2$, wherein, when the filament diameter of a steel cord is d, $I = \Sigma ((\pi/64)d^4)$ and $A = \pi \Sigma (d/2)^2$.

Further, in the case of B defects, it is known that the breakability of the belt layers at the inner side governs cut resistance. The strength of the steel cords is usually expressed by a value which is obtained by a uniaxial tension test. However, as a result of various studies, the inventors of the present invention discovered that the breakage of the steel cords at the cut does not depend only on tension at the time of pulling, and that the tension generated within the steel cords is greatly effected by bending. The strength of the steel cord in a case in which bending and pulling are combined does not correspond one to one to a value obtained by a uniaxial tension test.

The cord strength when bending force is added is governed by the twisted structure of the steel cords. As the twisted structure becomes more simple, the cord strength becomes larger. This is because, when the twisted structure is simple, there is little constraint of the filaments when the steel cord is bent, and stress does not concentrate on the filaments at the outer side of the bending.

A "simple twisted structure" means that the number of filaments twisted together is small. The filament diameter is made correspondingly larger, and the flexural rigidity of the steel cord, i.e., the cross sectional secondary moment, becomes large.

As a result of their studies, the present inventors found that strength against pulling when bending force is added can be increased greatly if the ratios I/A of the cross sectional secondary moments I to the cross sectional areas A of the steel cords are greater than or equal to $4.5 \times 10^{-3}$ mm$^2$.

In a third aspect of the present invention, in the heavy duty radial tire of the first aspect, ratios I/A of cross sectional secondary moments I and cross sectional areas A of the steel cords of the group of inner layers are greater than or equal to $4.5 \times 10^{-3}$ mm$^2$, wherein, when the filament diameter of a steel cord is d, $I = \Sigma ((\pi/64)d^4)$ and $A = \pi \Sigma (d/2)^2$.

In a fourth aspect of the present invention, in the heavy duty radial tire of the first aspect, ratios I/A of cross sectional secondary moments I and cross sectional areas A of the steel cords of at least one layer of the group of outer layers and ratios I/A of cross sectional secondary moments I and cross sectional areas A of the steel cords of the group of inner layers are respectively greater than or equal to $4.5 \times 10^{-3}$ mm$^2$, wherein, when the filament diameter of a steel cord is d, $I = \Sigma ((\pi/64)d^4)$ and $A = \pi$.

The heavy duty radial tire of the first aspect comprises: a belt layer assembly which is provided at a crown portion of a carcass extending in a toroidal shape, said belt layer assembly being formed of at least four layers which are formed from steel cords, wherein the belt layer assembly is divided into two groups, a group of outer layers positioned at an outer side in a radial direction of said radial tire and a group of inner layers positioned at an inner side in the radial direction of said radial tire, the cross sectional areas of the steel cords of at least one layer of the group of outer layers are greater than the cross sectional areas of the steel cords of the group of inner layers, wherein ratios I/A of cross sectional secondary moments I and cross sectional areas A of the steel cords of at least one layer of the group of outer layers and the group of inner layers are greater than or equal to $4.5 \times 10^{-3}$ mm$^2$, wherein, when the filament diameter of a steel cord is d, $I = \Sigma ((\pi/64)d^4)$ and $A = \pi \Sigma (d/2)^2$. Accordingly, a superior effect can be achieved in that cut resistance can be improved without deterioration in the other properties of the tire.

In the heavy duty radial tire of the second aspect of the present invention, the belt layer assembly formed of at least four layers is divided into two groups: a group of outer layers positioned at the outer side in the radial direction of the tire, and a group of inner layers positioned at the inner side in the radial direction of the tire. When the cross sectional areas of the steel cords of at least one layer of the group of outer layers are greater than the cross sectional areas of the steel cords of the group of inner layers, the ratios I/A between the cross sectional secondary moments I and the cross sectional areas A of the steel cords of the at least one belt layer among the group of outer layers are greater than or equal to $4.5 \times 10^{-3}$ mm$^2$. Therefore the flexural rigidity of the group of outer layers, which is subject to local bending deformation when the tire travels over sharp projections, can be improved, and breakage of the belt when the tire travels over sharp projections can be effectively prevented.

In a case in which the belt layer assembly has 5 or more layers, the ratios I/A of the filaments should be set to greater than or equal to $4.5 \times 10^{-3}$ mm$^2$ for at least either one or both of the two outermost layers.

It is preferable that the ratio of the cross sectional areas of the steel cords having large cross sectional areas to the cross sectional areas of the steel cords having small cross sectional areas is at least 1.3.

One or two protective belt layers formed from high elongation cords may arranged at the radial direction outer side of the belt layer assembly in order to improve cut resistance even more.

Because the direction of breakage is random, it is preferable that adjacent cords of the belt layers cross each other.

As described above, in the heavy duty radial tire of the second aspect of the present invention, the filaments forming the steel cords of the group of outer layers are formed so as to have large diameters, and the ratios I/A of the cross sectional secondary moments I and the cross sectional areas A of the steel cords are greater than or equal to $4.5 \times 10^{-3}$ mm$^2$. Therefore, a superior effect is achieved in that cut resistance when the tire travels over sharp projections can be improved.

In the heavy duty radial tire of the third aspect of the present invention, the belt layer assembly formed of at least four layers is divided into two groups: a group of outer layers positioned at the outer side in the radial direction of the tire, and a group of inner layers positioned at the inner side in the radial direction of the tire when the cross sectional areas of the steel cords of at least one layer of the group of outer layers are greater than the cross sectional areas of the steel cords of the group of inner layers, the ratios I/A of the cross sectional secondary moments I and the cross sectional areas A of the steel cords of the group of inner layers are at least $4.5 \times 10^{-3}$ mm$^2$. Therefore, there is resistance against tension applied to the belt layers at the outer side of the bending deformation when the tire travels over relatively dull, large protrusions, i.e., there is resistance against tension applied to layers of the group of inner layers. Belt breakage when the tire travels over relatively dull, large protrusions can be effectively prevented.

It is preferable that the ratio of the cross sectional areas of the steel cords having large cross sectional areas to the cross sectional areas of the steel cords having small cross sectional areas is at least 1.3.

One or two protective belt layers formed from high elongation cords may arranged at the radial direction outer side of the belt layer assembly in order to improve cut resistance even more.

Because the direction of breakage is random, it is preferable that adjacent cords of the belt layers cross each other.

In the heavy duty radial tire of the third aspect of the present invention, the ratios I/A of the cross sectional secondary moments I and the cross sectional areas A of the steel cords of the group of inner layers are greater than or equal to $4.5 \times 10^{-3}$ mm$^2$. Therefore, a superior effect is achieved in that cut resistance when the tire travels over dull, large protrusions can be improved, and also, cut resistance when the tire travels over sharp projections can be improved.

In accordance with the fourth aspect of the present invention, the ratios I/A of the cross sectional secondary moments I and the cross sectional areas A of the steel cords of at least one layer of the group of outer layers and the ratios I/A of the cross sectional secondary moments I and the cross sectional areas A of the steel cords of the group of inner layers are greater than or equal to $4.5 \times 10^{-3}$ mm$^2$. Therefore, the flexural resistance of the group of outer layers which are subject to local bending deformation when the tire travels over sharp projections is improved even more than in the third aspect of the present invention. Belt breakage when the tire travels over sharp projections can be effectively prevented. Further, there is resistance against tension which acts on the belt layers which are at the outer side of the bending deformation when the tire travels over relatively dull protrusions, i.e., there is resistance against tension which acts on the group of inner layers. Belt breakage when the tire travels over relatively dull protrusions can be effectively prevented.

It is preferable that the ratio of the cross sectional areas of the steel cords having large cross sectional areas to the cross sectional areas of the steel cords having small cross sectional areas is at least 1.3.

One or two protective belt layers formed from high elongation cords may arranged at the radial direction outer side of the belt layer assembly in order to improve cut resistance even more.

Because the direction of breakage is random, it is preferable that adjacent cords of the belt layers cross each other.

DESCRIPTION OF THE PREFERRED EMBODIMENTS

An embodiment of the present invention will be described with reference to FIG. 1.

The heavy duty radial tire of the present invention has a bead portion having a bead core, a sidewall portion which extends from the bead portion toward the outer side in the radial direction of the tire, and a tread portion which is connected to the upper edge of the sidewall portion. The tire has a radial structure comprising a carcass which runs from the tread portion to the sidewall portion and which is folded back around the bead core, and a belt layer assembly arranged at the tread portion outwardly of the carcass in the radial direction of the tire.

Figure 1:
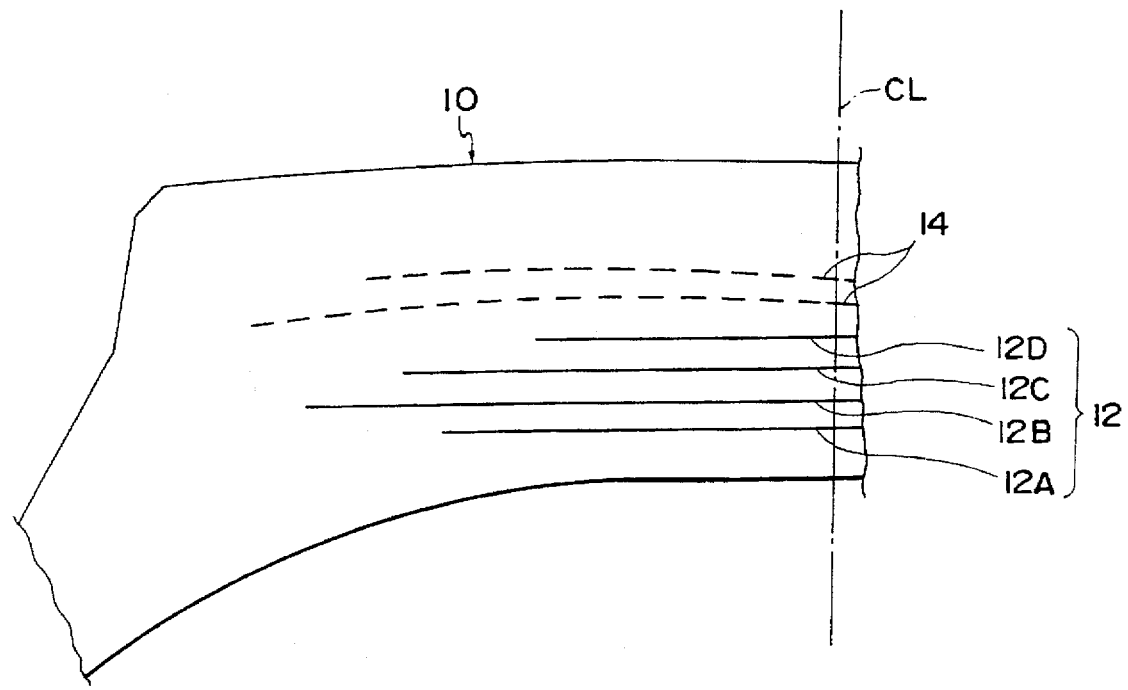
FIG. 1 is a cross sectional view of a heavy duty radial tire relating to the present invention.

As illustrated in FIG. 1, a belt layer assembly 12 of a heavy duty radial tire 10 of the present invention is formed from four layers a first belt 12A, a second belt 12B, a third belt 12C and a fourth belt 12D) which are arranged from the inner side of the tire to the outer side of the tire in that order.

In the present embodiment, the first belt 12A, the second belt 12B, the third belt 12C, and the fourth belt 12D have steel cords which are arranged at angles with respect to the equatorial plane CL of the tire. The steel cords of the first belt 12A and the third belt 12C are disposed at angles of 21' to the upper right with respect to the equatorial plane CL of the tire. The steel cords of the second belt 12B and the fourth belt 12D are arranged at angles of 21' to the upper left with respect to the equatorial plane CL of the tire.

Two protective belt layers 14 formed from high elongation cords are disposed at the outer side of the belt layer assembly 12 in the radial direction.

Assuming that the belt layer assembly 12 is divided into two groups: a group of outer layers disposed at the radial direction outer side and a group of inner layers disposed at the radial direction inner side, it is preferable that the steel cords of at least one layer of the group of outer layers have larger diameters than the diameters of the steel cords of the group of inner layers, and that the ratio of diameters is greater than or equal to 1.3.

Further, it is preferable that the ratios I/A of the cross sectional secondary moments I and the cross sectional areas A are greater than or equal to $4.5 \times 10^{-3}$ mm$^2$ for the steel cords of the group of outer layers, whose diameters are larger than those of the steel cords of the group of inner layers. In this way, tensile breakage, which begins from the filaments of the outer sides of the steel cords of the group of outer layers which bend locally when the tire travels over sharp projections, can be suppressed. Belt breakage occurring when the tire travels over sharp projections can be effectively prevented.

In the present invention, the flexural rigidity of the steel cords contributes only slightly to the flexural rigidity of the belt layer assembly 12. Therefore, even if the flexural rigidity of the steel cords is increased, the flexural rigidity of the belt layer assembly 12 does not increase, and cut-resistance is not adversely effected.

Next, another embodiment of the present invention will be described.

The structure of the belt layer assembly 12 of the heavy duty radial tire 10 of the present embodiment differs from that of the heavy duty radial tire 10 of the previous embodiment.

In the present embodiment, the ratios I/A of the cross sectional secondary moments I and the cross sectional areas A are greater than or equal to $4.5 \times 10^{-3}$ mm$^2$ for the steel cords of the group of inner layers, i.e., the steel cords of the first belt 12A and the second belt 12B. In this way, the strength of the belt layers at the outer side of the bending deformation at the time the tire travels over relatively dull, large protrusions, i.e., the strength of the first belt layer 12A and the second belt layer 12B at the inner side in the radial direction of the tire, can be improved, so that breakage of the belts at the radial direction inner side can be suppressed. Accordingly, belt breakage occurring when the tire travels over relatively dull, large protrusions can effectively be prevented.

[Experimental Example]

ORR 37.00R57 size tires having the structure illustrated in FIG. 1 were fabricated in accordance with the specifications shown in Table 1 and Table 2, and a cut test was performed.

Figure 2:
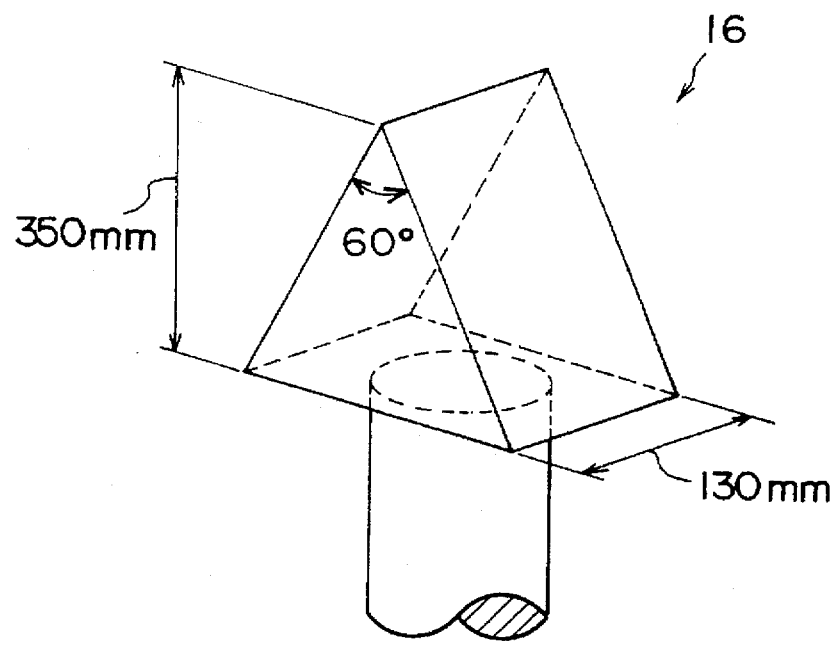
FIG. 2 is a perspective view of a wedge-shaped push-in piece.
Figure 3:
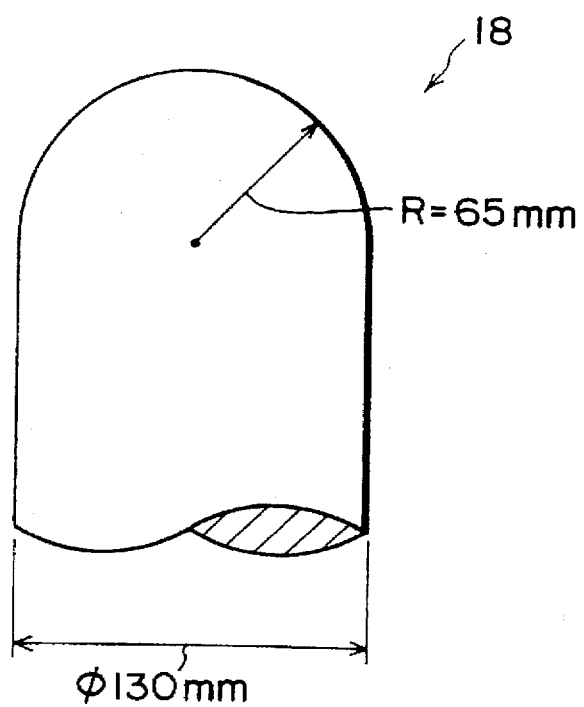
FIG. 3 is a perspective view of a push-in piece whose tip end is hemispherical.

In the cut test, a push-in piece was pushed into the center of the tread of the test tire which had been inflated to prescribed internal pressure. Energy, as calculated from the load at the time breakage of a belt occurred and from the depth to which the push-in piece was pushed in, was determined. Comparison was made by using relative indices, with the index of the conventional tire being 100. Two types of push-in pieces were used: a push-in piece 16 having a sharp, wedge-shaped tip end patterned after a sharp protrusion (see FIG. 2), and a push-in piece 18 having a hemispherical tip end patterned after a dull object (see FIG. 3).

"A type" in the tables refers to a cut test using the push-in piece 16, and "B type" refers to a cut test using the push-in piece 18. Cord types "C" through "G" in Tables 2, 3 denote cord types whose respective structures, cross sectional areas, and I/A are shown in Table 1 below.

TABLE 1

| Cord Type | Cord Structure | Cross Sectional Area (mm$^2$) | I/A (mm$^2$) |
| --- | --- | --- | --- |
| C | {7 × (3 + 9)} × 0.24 + 1 | 3.80 | 3.60 × 10$^{-3}$ |
| D | {7 × (3 + 9 + 15)} × 0.23 + 1 | 7.85 | 1.58 × 10$^{-3}$ |
| E | {7 × (3 + 9)} × 0.34+ 1 | 7.63 | 7.22 × 10$^{-3}$ |
| F | {7 × (3 + 9 + 15)} × 0.24 + 1 | 8.55 | 3.60 × 10$^{-3}$ |
| G | {7 × (1 + 6)} × 0.32 + 1 | 3.94 | 7.29 × 10$^{-3}$ |

TABLE 2

| | Belt | Cord Type | Number of Embedded Cords (cords per 25 mm) | Belt Strength | Resistance (A type) | Weight |
| --- | --- | --- | --- | --- | --- | --- |
| Conventional Tire | 4B | C | 6.5 | 100 | 100 | 100 |
| | 3B | C | 6.5 | | | |
| | 2B | C | 6.5 | | | |
| | 1B | C | 6.5 | | | |
| Comparison Tire 1 | 4B | D | 4.0 | 114 | 110 | 103 |
| | 3B | D | 4.0 | | | |
| | 2B | C | 6.5 | | | |
| | 1B | C | 6.5 | | | |
| Embodiment Tire 1 | 4B | C | 6.5 | 106 | 120 | 101 |
| | 3B | E | 4.0 | | | |
| | 2B | C | 6.5 | | | |
| | 1B | C | 6.5 | | | |
| Embodiment Tire 2 | 4B | E | 4.0 | 106 | 126 | 101 |
| | 3B | C | 6.5 | | | |
| | 2B | C | 6.5 | | | |
| | 1B | C | 6.5 | | | |
| Embodiment Tire 3 | 4B | E | 4.0 | 112 | 145 | 103 |
| | 3B | E | 4.0 | | | |
| | 2B | C | 6.5 | | | |
| | 1B | C | 6.5 | | | |

As can be seen from the experimental results of Table 2, the tires of the present invention, in which the ratios I/A between the cross sectional secondary moments I and the cross sectional areas A are at least 4.5×10$^{-3}$ mm$^2$ at the steel cords of the group of outer layers whose diameters are greater than those of the steel cords of the group of inner layers, are superior with respect to cut resistance when the tire travels over a sharp protrusion.

In accordance with the structure of the present invention, the increase in tire weight is slight, and the increase in cost can also be kept to a minimum.

TABLE 3

| | Belt | Cord Type | Number of Embedded Cords (cords per 25 mm) | Belt Strength | Cut Resistance (A type) | Cut Resistance (B type) |
| --- | --- | --- | --- | --- | --- | --- |
| Conventional Tire | 4B | C | 6.5 | 100 | 100 | 100 |
| | 3B | C | 6.5 | | | |
| | 2B | C | 6.5 | | | |
| | 1B | C | 6.5 | | | |
| Comparison Tire 2 | 4B | F | 3.8 | 114 | 116 | 92 |
| | 3B | F | 3.8 | | | |
| | 2B | C | 6.5 | | | |
| | 1B | C | 6.5 | | | |
| Embodiment Tire 4 | 4B | F | 3.8 | 112 | 117 | 121 |
| | 3B | F | 3.8 | | | |
| | 2B | G | 6.0 | | | |
| | 1B | G | 6.0 | | | |
| Embodiment Tire 5 | 4B | F | 3.8 | 115 | 121 | 130 |
| | 3B | F | 3.8 | | | |
| | 2B | G | 6.4 | | | |
| | 1B | G | 6.4 | | | |
| Embodiment Tire 6 | 4B | E | 4.0 | 113 | 148 | 133 |
| | 3B | E | 4.0 | | | |
| | 2B | G | 6.4 | | | |
| | 1B | G | 6.4 | | | |

As can be seen from the experimental results of Table 3, the tires of the present invention (the tires of embodiments 4 through 6), in which the ratios I/A between the cross sectional secondary moments I and the cross sectional areas A are at least 4.5×10$^{-3}$ mm$^2$ for the steel cords of the group of inner layers, are not only superior with respect to cut resistance when the tire travels over a dull, large protrusion, but also exhibit improved cut resistance when the tire travels over a sharp projection.

What is claimed is:

1. A heavy duty radial tire comprising:
   a belt layer assembly which is provided at a crown portion of a carcass extending in a toroidal shape, said belt layer assembly being formed of at least four layers which are formed from steel cords, wherein the layers of said belt layer assembly are divided into two groups, a first group of outer layers positioned at an outer side in a radial direction of said radial tire and a second group of inner layers positioned at an inner side in the radial direction of said radial tire, the cross sectional areas of the steel cords of at least one layer of the first group of outer layers being greater than the cross sectional areas of the steel cords of the second group of inner layers, the cross-sectional areas of the steel cords of each of the first group of outer layers and each of the second group of inner layers being between 3.80 mm$^2$ and 8.55 mm$^2$,
   wherein ratios I/A of cross sectional secondary moments I and cross sectional areas A of the steel cords of at least one layer of the first group of outer layers and the second group of inner layers are greater than or equal to 4.5×10$^{-3}$ mm$^2$,
   wherein, when the filament diameter of a steel cord is d, $$I = \Sigma \left( (\pi/64) d^4 \right)$$

and $$A = \Sigma \pi (d/2)^2.$$

2. A heavy duty radial tire according to claim 1, wherein ratios I/A of cross sectional secondary moments I and cross sectional areas A of the steel cords of the at least one layer of the first group of outer layers are greater than or equal to $4.5 \times 10^{-3}$ mm$^2$, wherein, when the filament diameter of a steel cord is d, $$I = \Sigma \ ((\pi/64)d^4))$$

and $$A = \Sigma \pi \ (d/2)^2.$$

3. A heavy duty radial tire according to claim 2, wherein the cross sectional areas of the steel cords of the at least one layer of the group of outer layers are greater than or equal to 1.3 times the cross sectional areas of the steel cords of the group of inner layers.

4. A heavy duty radial tire according to claim 2, further comprising:

at least one protective belt layer disposed at an outer side, in the radial direction of said radial tire, of said belt layer assembly formed of at least four layers.

5. A heavy duty radial tire according to claim 4, wherein said at least one protective belt layer is formed from high elongation cords.

6. A heavy duty radial tire according to claim 2, wherein the steel cords of adjacent belt layers of said belt layer assembly formed of at least four layers are provided so as to be inclined in mutually opposite directions with respect to an equatorial plane of said radial tire.

7. A heavy duty radial tire according to claim 1, wherein ratios I/A of cross sectional secondary moments I and cross sectional areas A of the steel cords of the second group of inner layers are greater than or equal to $4.5 \times 10^{-3}$ mm$^2$, wherein, when the filament diameter of a steel cord is d, $$I = \Sigma \ ((\pi/64)d^4))$$

and $$A = \pi \Sigma \ (d/2)^2.$$

8. A heavy duty radial tire according to claim 7, wherein the cross sectional areas of the steel cords of the at least one layer of the group of outer layers are greater than or equal to 1.3 times the cross sectional areas of the steel cords of the group of inner layers.

9. A heavy duty radial tire according to claim 7, further comprising:

at least one protective belt layer disposed at an outer side, in the radial direction of said radial tire, of said belt layer assembly formed of at least four layers.

10. A heavy duty radial tire according to claim 9, wherein said at least one protective belt layer is formed from high elongation cords.

11. A heavy duty radial tire according to claim 7, wherein the steel cords of adjacent belt layers of said belt layer assembly formed of at least four layers are provided so as to be inclined in mutually opposite directions with respect to an equatorial plane of said radial tire.

12. A heavy duty radial tire according to claim 1, wherein ratios I/A of cross sectional secondary moments I and cross sectional areas A of the steel cords of the at least one layer of the first group of outer layers and ratios I/A of cross sectional secondary moments I and cross sectional areas A of the steel cords of the second group of inner layers are respectively greater than or equal to $4.5 \times 10^{-3}$ mm$^2$, wherein, when the filament diameter of a steel cord is d, $$I = \Sigma \ ((\pi/64)d^4))$$

and $$A = \pi \Sigma \ (d/2)^2.$$

13. A heavy duty radial tire according to claim 12, wherein the cross sectional areas of the steel cords of the at least one layer of the group of outer layers are greater than or equal to 1.3 times the cross sectional areas of the steel cords of the group of inner layers.

14. A heavy duty radial tire according to claim 12, further comprising:

at least one protective belt layer disposed at an outer side, in the radial direction of said radial tire, of said belt layer assembly formed of at least four layers.

15. A heavy duty radial tire according to claim 14, wherein said at least one protective belt layer is formed from high elongation cords.

16. A heavy duty radial tire according to claim 12, wherein the steel cords of adjacent belt layers of said belt layer assembly formed of at least four layers are provided so as to be inclined in mutually opposite directions with respect to an equatorial plane of said radial tire.

* * * * *